United States Patent [19]
Berthaud

[11] Patent Number: 6,157,957
[45] Date of Patent: Dec. 5, 2000

[54] CLOCK SYNCHRONIZATION SYSTEM AND METHOD USING A CONTINUOUS CONVERSION FUNCTION FOR A COMMUNICATION NETWORK

[75] Inventor: Jean-Marc Berthaud, Villeneuve Loubet, France

[73] Assignee: Cisco Technology, Inc., San Jose, Calif.

[21] Appl. No.: 09/133,396

[22] Filed: Aug. 13, 1998

[30] Foreign Application Priority Data

Jan. 22, 1998 [EP] European Pat. Off. .............. 98480004

[51] Int. Cl.[7] ...................................................... G06F 15/16
[52] U.S. Cl. .......................................................... 709/248
[58] Field of Search ........................... 709/248; 713/400, 713/401, 600, 601

[56] References Cited

U.S. PATENT DOCUMENTS

| | | | |
|---|---|---|---|
| 5,386,542 | 1/1995 | Brann et al. | 709/248 |
| 5,402,394 | 3/1995 | Turski | 368/10 |
| 5,408,506 | 4/1995 | Mincher et al. | 375/356 |
| 5,535,217 | 7/1996 | Cheung et al. | 709/248 |
| 5,689,688 | 11/1997 | Strong et al. | 709/400 |
| 5,790,805 | 8/1998 | Bantum | 709/248 |
| 5,907,685 | 5/1999 | Douceur | 709/248 |
| 5,968,133 | 10/1999 | Latham et al. | 709/248 |

FOREIGN PATENT DOCUMENTS

98/56135  12/1998  WIPO .............................. H04L 7/00

*Primary Examiner*—Zarni Maung
*Assistant Examiner*—Nkosi Trim
*Attorney, Agent, or Firm*—Cesari and McKenna

[57] ABSTRACT

A clock synchronization system and method in a communication network comprise a plurality of nodes in communication with each other by data transfer over communication links. Each of the nodes has its own local time base and exchanges timing information with a predefined node called master whose time base is the master clock against which said local time base is to be synchronized. At predefined moments in time, each node having a master exchanges timing information with the master node, calculates therefrom a timing data and stores said timing data into a predefined storage location called History; such as to obtain after at least two exchanges, a sequence of timing data stored in the History. From said sequence of timing data, a set of parameters is calculated and stored. The stored parameters are further used for computing a conversion function whereby the node local time is converted upon request into the master time base with a pre-specified and guaranteed precision.

15 Claims, 6 Drawing Sheets

CLOCK SYNCHRONIZATION SYSTEM AND METHOD USING A CONTINUOUS CONVERSION FUNCTION FOR A COMMUNICATION NETWORK

BACKGROUND OF THE INVENTION (1) Field of the Invention

This invention relates to communication network. More particularly, the invention relates to a clock synchronization system and method using a continuous conversion function for a communication network.

(2) Description of Prior Art

Clock synchronization is a general requirement in distributed systems where a plurality of nodes or computing units in different locations operate concurrently, and can be defined as the action of making different clocks to agree on a same time reading. Clock synchronization ensures that operations occur in the logically correct order, and it allows the establishment of causal implications between events in different computational units. Clock synchronization is particularly required in databases merging or gathering from a plurality of locations, global reporting of sorted time stamped data from a plurality of nodes, duration determination and performance analysis of processes distributed over a network, distributed processing requiring strict timing constraints (e.g., real time processing), time-of-day (distribution of time and date to stations) or other time distribution applications.

More particularly, within a communication network where nodes are exchanging data with each other using bidirectional communication lines, time synchronization is required for example when one wants to measure the delay of time between the occurrence of events in different nodes of the network, and also to determine accurately the error made on this measurement. In order to measure such a delay, each of the events must be dated with the same its own local clock which may slightly differ from the others (e.g., in frequency), there is a need for a clock synchronizing process to apply to the plurality of local clocks of the different nodes. Since this process is bound to make errors due to physical uncertainties, the clock synchronizing process has also to precisely estimate the error rate, and to minimize it.

Clock synchronization processes are typically implemented using hardware components or software components. Hardware implementations rely on a specific clock network for transmitting clocks signals in order to make one local clock dependent to the other, such that they indicate the same time with an acceptable error. Such specific clock network may include hardware circuits such as PLLs (phase-locked loops) to monitor and control the local clocks. On the other hand, software implementations typically consist in regularly adjusting the time values of the different local clocks, so that they all indicate the same time within a predetermined error interval. This adjustment is typically achieved by using an observation mechanism which calculates an offset to apply to the local clocks. Software implementations generally concern technical fields such as distributed processing, database systems and multiprocessing. Examples of software techniques well known in the art are the 4.3 BSD timed protocol from University of California, Berkeley, the Internet Network Time Protocol (NTP), the Digital Time Service (DTS) from Digital Equipment Corp. These foregoing techniques are briefly reviewed hereinafter.

The 4.3 BSD timed protocol is intended for use in local area networks (LANs). The BSD implementation uses a single master-time daemon named timed ("d" stands for daemon) which is running on a computer station called the master. Other stations connected to the network are referenced to as slaves. Slaves stations have to connect with the master daemon through the network and register on it, in such a way the master can monitor the offset between its own clock and the slaves' clock, and send to each slave the appropriate correction factor to apply to its clock. The Internet NTP protocol is intended to connect several primary reference sources to widely available locations such as gateways on the Internet. The Internet NTP protocol uses UDP (User Datagram Protocol) and relies upon sophisticated algorithms for electing time sources, and combining them in an accurate time. The Internet NTP protocol is based on a classical principle of messages exchange for monitoring the offset between a slave and a master and is considered as a variant of the so-called returnable-time system (RTS) used in some digital telephone networks. The Digital Time Service (DTS) addresses most of the objectives addressed by Internet NTP. Additionally DTS offers features for bounding the maximum errors inherent to the time-transfer procedures, and for supporting correctness principles.

Prior art software clock synchronization methods such as those cited above, typically rely on a clock adjustment process. One disadvantage of clock adjustment processes is not to guarantee the coherence of the local time at each node and induce corruption of time delay measurements. This corruption happens at each clock adjustment, whatever method is used for adjusting, and consequently introduce an error in a delay measurement between events occurring around the adjustment period. Furthermore, the error introduced by the adjustment process cannot be estimated since it depends on the process time required for adjusting the local clock, from the moment a new clock value is computed to the moment it is actually set in the clock. Another disadvantage of prior art software clock synchronization methods resides in that assessment of errors due to processing and transmission of master time information to slave station is computed statistically, based on master clock observations. As the error estimation is provided as a value within a confidence interval, applying a correction value based on such error estimation does not allow a precise correction.

U.S. Pat. No. 5,402,394 to Turski et al. issued Mar. 28, 1995 discloses a process for operating computing units in communication with each other by serial data transfer over data bus, each computing unit having its own clock generating system and the computing units exchanging timing information over the data bus. For this purpose, a time registration start signal is first fed into the data bus; thereupon, each computing unit stores its own time value upon identification of the time registration start signal, transfers the stored own time value at a later moment in time to the other computing units and stores the time values received from the other computing units. Each computing unit then compares its own stored time value with the stored time values of the other computing units and calculates the present time value of the other computing units taking into account its own present time value. Each computing node can thus ascertain the relationship between its local time and the local time bases of the other computing nodes, or a reference node, without having to adjust or correct the local time base.

The method disclosed in U.S. Pat. No. 5,402,394 solves the problem of delay measurement corruption by avoiding adjusting a local time base to a reference time base. However, there is not provided any error estimation method.

The present invention addresses the above-defined problems of the prior art by providing a clock synchronization method that avoids adjusting a local time base to a reference time base, by relying on analyzing the evolution of the offset between two clocks, in order to regularly compute parameters necessary for elaborating a continuous conversion function. The conversion function is further used for converting time values of one clock time base to the other, such that the conversion function provides accurate converted time values with a pre-determined precision.

SUMMARY OF THE INVENTION

An object of the invention is a clock synchronization system and method for use in a communication network that avoids adjusting a local time base to a reference time base and which guarantees a pre-specified precision.

Another object is an efficient and accurate clock synchronization method for synchronizing the local clocks of nodes in a distributed network.

A further object is a clock synchronization system and method which relies on the computing at each node of a conversion function of the node local time base into a master time base.

These and other objects are achieved in a communication network comprising a plurality of nodes in communication with each other by data transfer over communication links. Each of the nodes has its own local time base and exchanges timing information with a predefined node called master whose time base is a master clock against which said local time base is to be synchronized. At predefined moments in time, each node having a master exchanges timing information with the master node, calculates therefrom a timing data and stores said timing data into a predefined storage location called History; such as to obtain after at least two exchanges, a sequence of timing data stored in the History. From said sequence of timing data, a set of parameters is calculated and stored. The stored parameters are further used for computing a conversion function whereby the node local time is converted upon request into the master time base with a pre-specified and guaranteed precision.

BRIEF DESCRIPTION OF THE DRAWINGS

An embodiment of the invention will now be described, by way of example only, with reference to the accompanying drawings, wherein.

DETAILED DESCRIPTION OF THE INVENTION

The present invention can be implemented generally in distributed systems where a plurality of nodes or computing units in different locations operate concurrently. In the preferred embodiment, the invention is implemented in a communication network. The network comprises a plurality of nodes exchanging data to each other over communication links.

Figure 1:
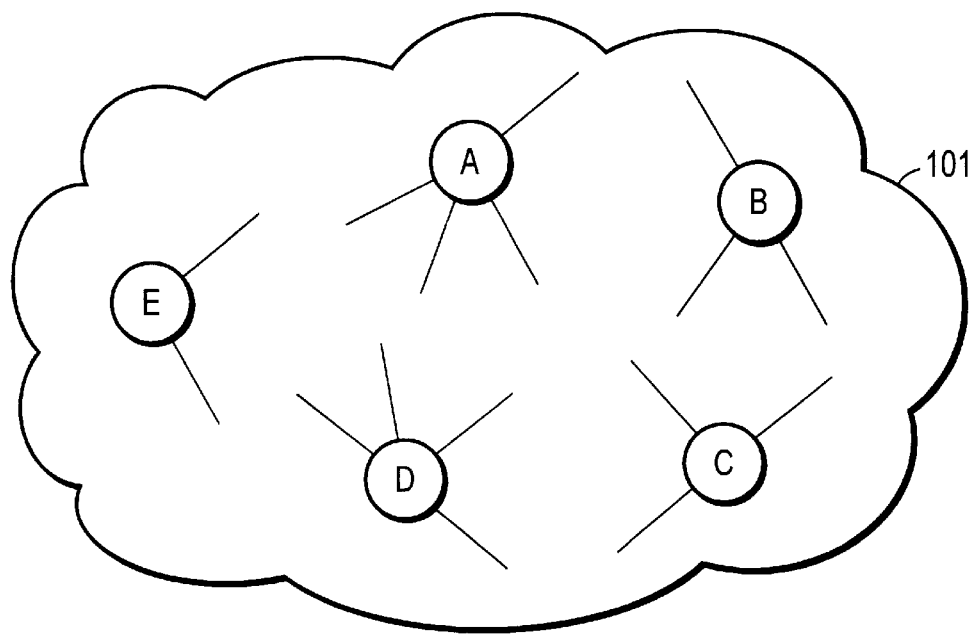
FIG. 1 is a representation of a simplified communication network wherein each node possesses its own clock generating system.

Referring to FIG. 1, there is shown a schematic view of a communication network 101 comprising fives nodes A, B, C, D, E, in communication with each other. Each of the nodes possesses its own clock generating system, herein also referred to as local clock. In such communication network, processes are necessary for performing tasks such as measuring the time delays between events occurring in different nodes, global reporting of sorted time stamped data from a plurality of nodes, or duration determination and performance analysis of processes distributed over the network, and so forth. This type of tasks requires that a clock synchronization process ensuring a requested precision should be applied to all local clocks of the network. The present invention provides such an accurate clock synchronization process and more generally a method for operating nodes of a communication network, which does not rely on local clocks adjusting and accordingly ensure local clock coherence. In the present invention, nodes are organized hierarchically into a master/slave structure. At least one of the nodes called master is selected as reference time for the other nodes which are called slaves. Furthermore, a master of several slaves may also be slave of another master.

Figure 2:
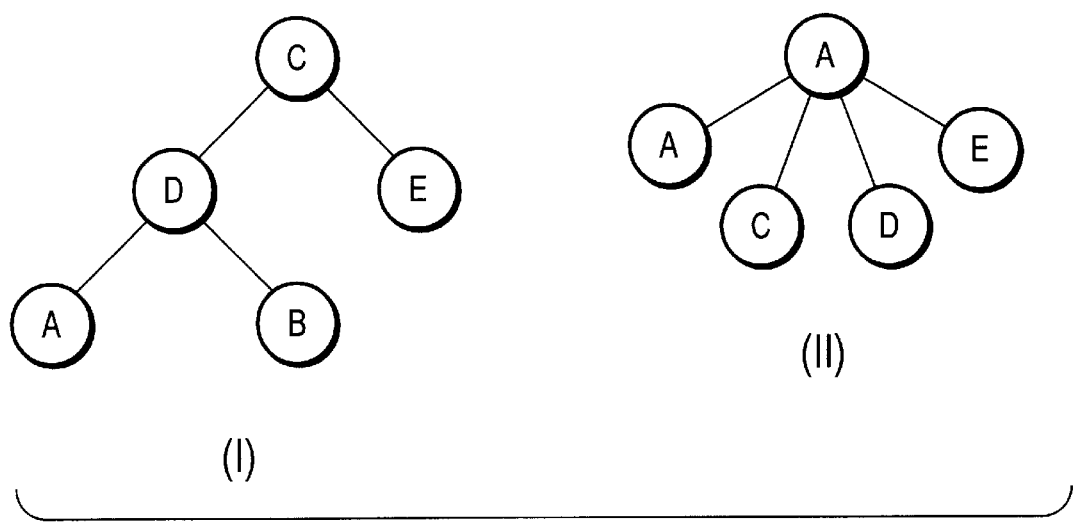
FIG. 2 is a representation of two examples of master/slave clock hierarchy configurations applied to the communication network of FIG. 1.

FIG. 2 shows two examples of master/slave clock hierarchy configurations in the communication network of FIG. 1. In example (I), node C is the clock master for nodes D and E which conversely are slaves for node C, while node D is also master for nodes A and B. In example (II), there is only one time reference: node B, which is the master of the other nodes A, C, D, E. The present invention does not depend on a particular master/slave hierarchical organization since, as will be further described, the invention implies communication only between one given slave and its master. The invention is implemented within each node or computing unit as a program referred to as "cell", resident in each node. The hierarchical organization illustrated by FIG. 2 commonly called tree organization, can be static or dynamic. A node is statically linked to its master by just specifying the network address of its master in its cell. Alternatively, the master/slave organization is dynamic when, for example, a node/cell with no master (none specified or not present) will try to find a reference cell by broadcasting messages over the network. If no master is found, the node/cell is only the reference (i.e., the "root") of the sub-tree attached to it. The communication links that connect the nodes to each other and resulting in a "tree of cells" topology, enable communication by using communication protocols such as TCP/IP (Transport Communication Protocol/Internet Protocol) or UDP (User Datagram Protocol) on IP, as well as using serial links and so forth. However these communications means must support broadcasting if dynamic reconfiguration of the hierarchical organization of the nodes is desired.

The clock synchronization method of the invention does not rely on time distributing e.g., by adjusting local times to a reference time, as it is the case in most of the above-cited prior art. Instead, the present invention relies on converting the time values measured at different nodes with different time bases into a unique time reference (master time). In that end, each slave maintains a conversion function of its local time into its master time. To get the parameters necessary to establish the conversion function, a slave regularly polls his master by exchanging synchronization messages over the network, in order to get for a given local time value the corresponding master time value as well as the absolute error related to it. Therefore, after each polling, the slave gets a "triplet" of values constituted by the slave time value, the corresponding master time value, and the absolute error made on the evaluation of the master time value. Then, each triplet obtained is stored into a slave dedicated storage location called "History", thereby creating a file containing a sequential set of such triplets. The history file is further used for modelling a mathematic function of conversion of the slave time into the master time associated with a guaranteed precision. The slave conversion function is finally called upon by request of a network task or of a human operator, to convert a node local time (slave time) into a reference time (master time). The foregoing underlies the algorithm implemented by the invention, which will be better understood with the following description in connection with FIG. 3.

In order to establish such a conversion function, it was assumed that the shift in frequency observed between the clocks of two nodes is constant over time. As a consequence, the relation between respective clocks of a slave S and its master M can be expressed as follows:

$$t_M(t) = t_S(t) + \delta(t) \quad (1)$$

with $\delta(t) = \delta + \sigma \cdot t_S(t)$
where:
- $t_S(t)$ and $t_M(t)$ designate respectively the time at slave S and the time at master M corresponding to absolute time t;
- $\delta(t)$ is the offset between the two clocks at the moment in time t, $\delta$ is the offset at $t_S(t)=0$, and $\sigma$ is a constant herein referred to as skew and defining a gradient.

Note: in all mathematical expressions disclosed herein, "+" stands for addition, "." stands for multiplication, and "/" stands for division.

Equation (1) above can also be expressed as:

$$t_M(t) = (1+\sigma) \cdot t_S(t) + \delta \quad (1')$$

Figure 3:
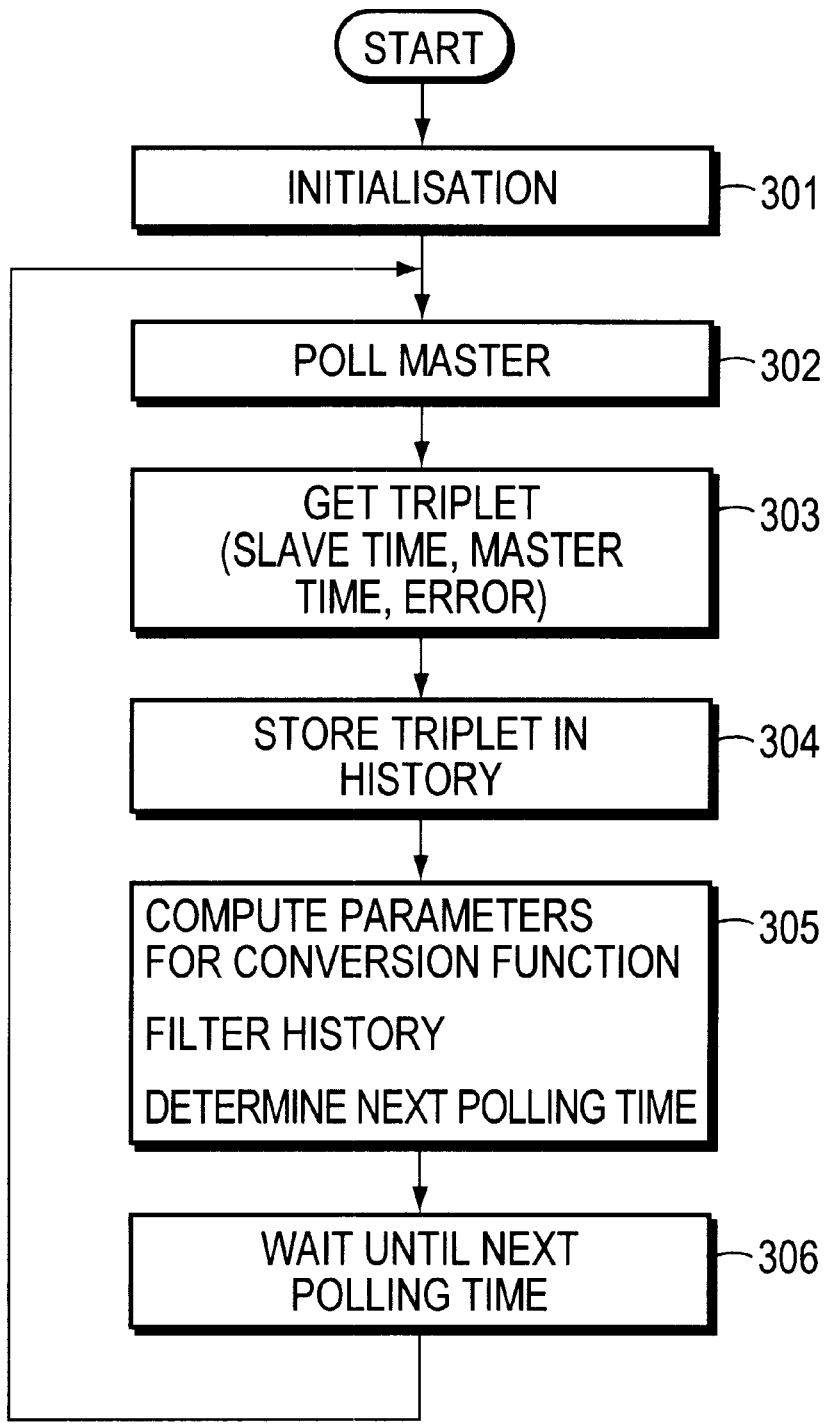
FIG. 3 is a flow chart illustrating an algorithm implemented in a slave node for computing a slave/master conversion function, according to the principles of the present invention.

Referring to FIG. 3 there is shown a flow chart illustrating the algorithm implemented in each slave for computing a slave/master conversion function. In box 301, various parameters are initialized such as a and the History table. Actually, rather than setting σ to an initial value which is hardly determinable, an interval is provided: [$\sigma_{min}$, $\sigma_{max}$] with $\sigma_{min}$, $\sigma_{max}$ having values of the order of some minutes per day in absolute value.

Figure 4:
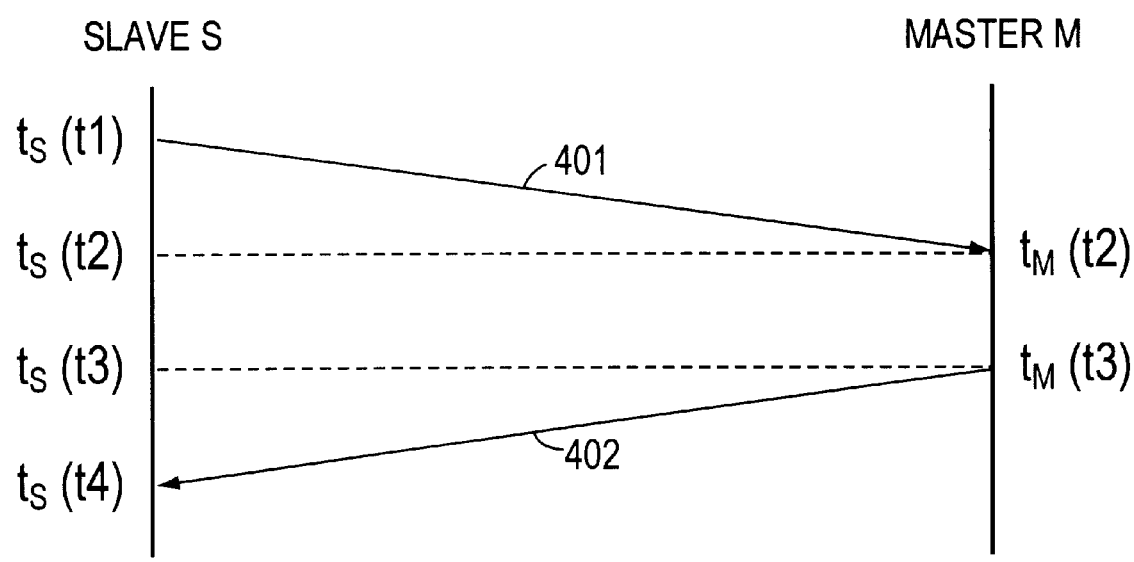
FIG. 4 is an illustration of a polling process whereby a slave gets time information from its master.

Also at initialization, the History table is set to zero. Then in box 302, the slave polls its master in order to get the necessary data for computing a conversion function of its clock into the master clock. As shown hereinafter, getting "the necessary data" consists for the slave in getting at each polling a master time $t_M(t)$ value corresponding to a slave time $t_S(t)$ value (with respect to absolute time t) as well as having an accurate uncertainty value (Δ) on master time $t_M(t)$ value. This "polling" is based on the exchange of network messages conveying time information between the slave and the master. As there is no possibility to determine exactly the transmission delay of a message transmitted over the network between the slave and the master in order to add it for correction to the time information it transports, a mechanism such as the one used in Network Time Protocol has been chosen in order to determine an approximation of the actual δ(t) of equation (1) above and the error made on it. FIG. 4 illustrates the exchange of messages between a slave and its master. At start time $t_S(t1)$ slave S sends a poll message 401 containing time stamp $t_S(t1)$ to master M. At master time $t_M(t2)$, master M receives the poll message and subsequently at time $t_M(t3)$, master M sends a response message 402 to slave S, which contains time stamps $t_S(t1)$, $t_M(t2)$, $t_M(t3)$. Finally, at slave time $t_S(t4)$, slave S receives response message 402. The round trip transmission delay $d_S$ in slave S time reference can be expressed as:

$$d_S = (t_S(t4) - t_S(t1)) - (t_S(t3) - t_S(t2)) \quad (2)$$

Then using equation (1) in equation (2), one can obtain the following equation:

$$d_S = (t_S(t4) - t_S(t1)) - 1/(1+\sigma) \cdot (t_M(t3) - t_M(t2)) \quad (3)$$

Now, considering the moment in absolute time $t=(t2+t3)/2$, one can write:

$$t_S(t) = \frac{1}{2} \cdot (t_S(t2) + t_S(t3)) \quad (4')$$

and $$t_M(t) = \frac{1}{2} \cdot (t_M(t2) + t_M(t3)) \quad (4'')$$

It can be shown that the offset δ(t) between slave clock and master clock can be expressed as:

$$\delta(t) = \frac{1}{2} \cdot (t_S(t2) - t_S(t1) + t_M(t3) - t_S(t4)) + E \text{ with } |E| \leq d_S/2 \quad (5)$$

where |E| is the absolute value of E, and "<=" stands for "inferior or equal".

Now, from equations (1), (4") and (5), one can obtain:

$$t_S(t) = \frac{1}{2} \cdot (t_S(t1) + t_S(t4)) - E$$

Finally, at each polling moment in time (t1), a slave node S polls its master node M in order to get the following triplet:

$$(t_S(t), t_M(t), \Delta) \quad (6)$$

where:
- $t_S(t)$ is the slave local time corresponding to absolute time t with $t=(t2+t3)/2$,
- $t_M(t)$ is the corresponding master local obtained from data transmitted by master (FIG. 2, 402),
- Δ is the uncertainty value (i.e. "error") associated with $t_M(t)$;

with:

$$t_S(t) = \frac{1}{2} \cdot (t_S(t1) + t_S(t4))$$

$$t_M(t) = \frac{1}{2} \cdot (t_M(t2) + t_M(t3))$$

$$\Delta = |(1+\sigma) \cdot d_S/2|$$

$d_S$ is defined at equation (3). Δ is actually a close overestimation of the uncertainty which is not exactly known (cf. |E| at equation (5) above).

Figure 5:
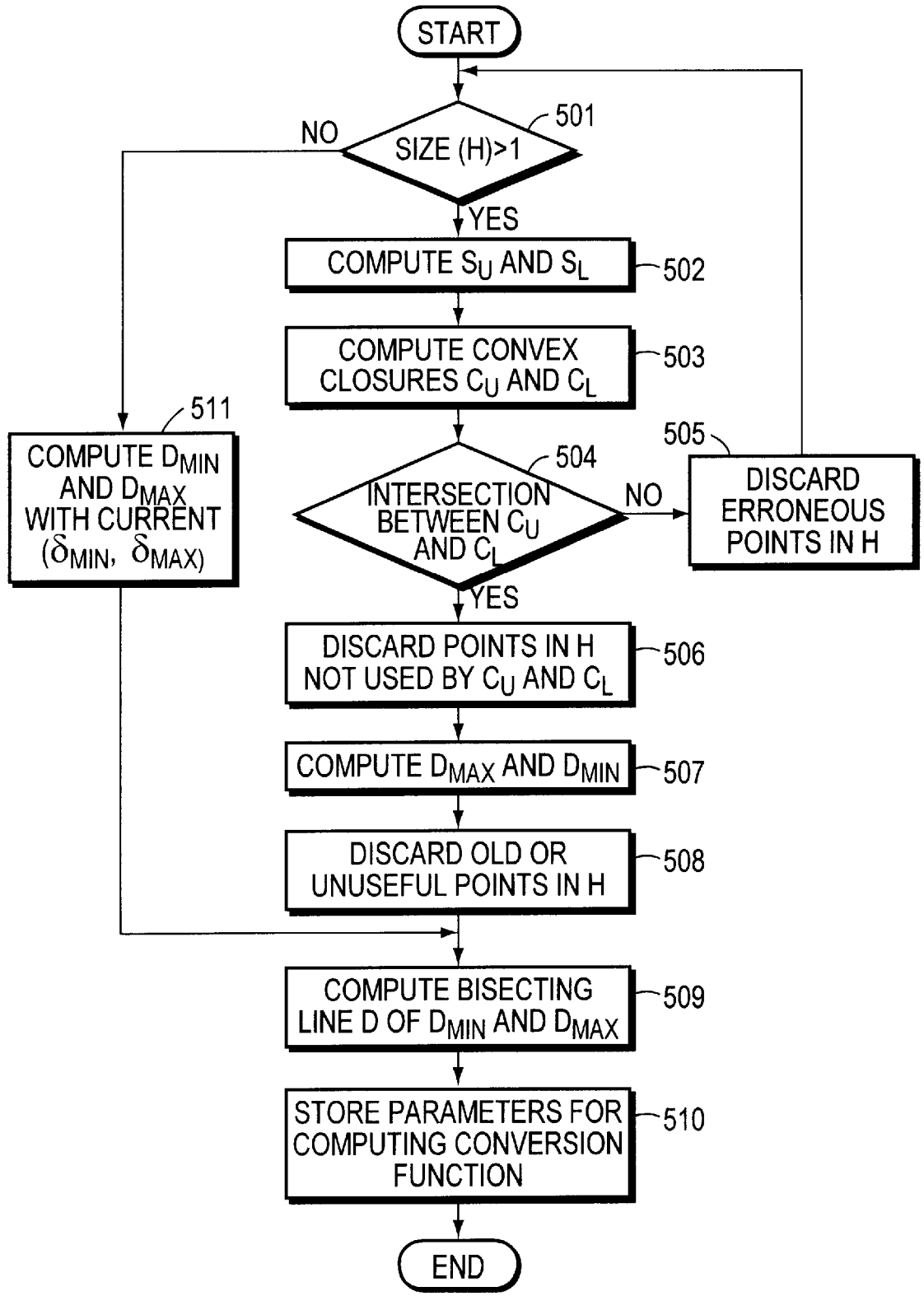
FIG. 5 is a detailed flow chart of the sequence of operations accomplished in a slave node to calculate the necessary parameters for computing the time conversion function according to the principles of the present invention.

Referring back to FIG. 3, in box 303 the triplet (6) defined above is acquired by the slave node after polling step 302. Then in box 304 the triplet is stored in a storage location referred herein to as History, such as in a RAM (random access memory) or in a file of a file system. Triplets obtained successively by consecutive pollings are sequentially stored in the History. Further, in box 305, the triplets stored in the History are used to compute a function of conversion of the slave local time into the master local time. A filtering of the History is also accomplished to delete triplets that do not contribute effectively in improving the precision. Also in this step, the next polling time for getting a triplet to improve the precision of the conversion function is determined. Finally, in box 306, the slave wait until the predetermined next polling time to restart the foregoing sequence of steps by polling the master (box 302). After various pollings the History contains a sequence of triplets according to formula (6). In other words, for one given polling k the History contains one discrete point $M_k$ with two coordinates: $(t_S(k), t_M(k))$, with an uncertainty value of $\Delta(k)$ to be applied to second coordinate $t_M(k)$. The operations executed in box 305 are detailed in the flow chart of Referring to FIG. 5, operation starts with decision box 501 in which the size of the History (Size(H)) is tested. If the History contains more than one such point defined above (Size(H)>1) then box 502 is entered for computing two sets of points $S_U$ and $S_L$ from the History, which are defined as follows:

$$S_U = \{\text{points } P_k \text{ of coordinates } (t_S(k), t_M(k)+\Delta(k)), \forall k\}$$

$$S_L = \{\text{points } Q_k \text{ of coordinates } (t_S(k), t_M(k)-\Delta(k)), \forall k\}$$

Figure 6:
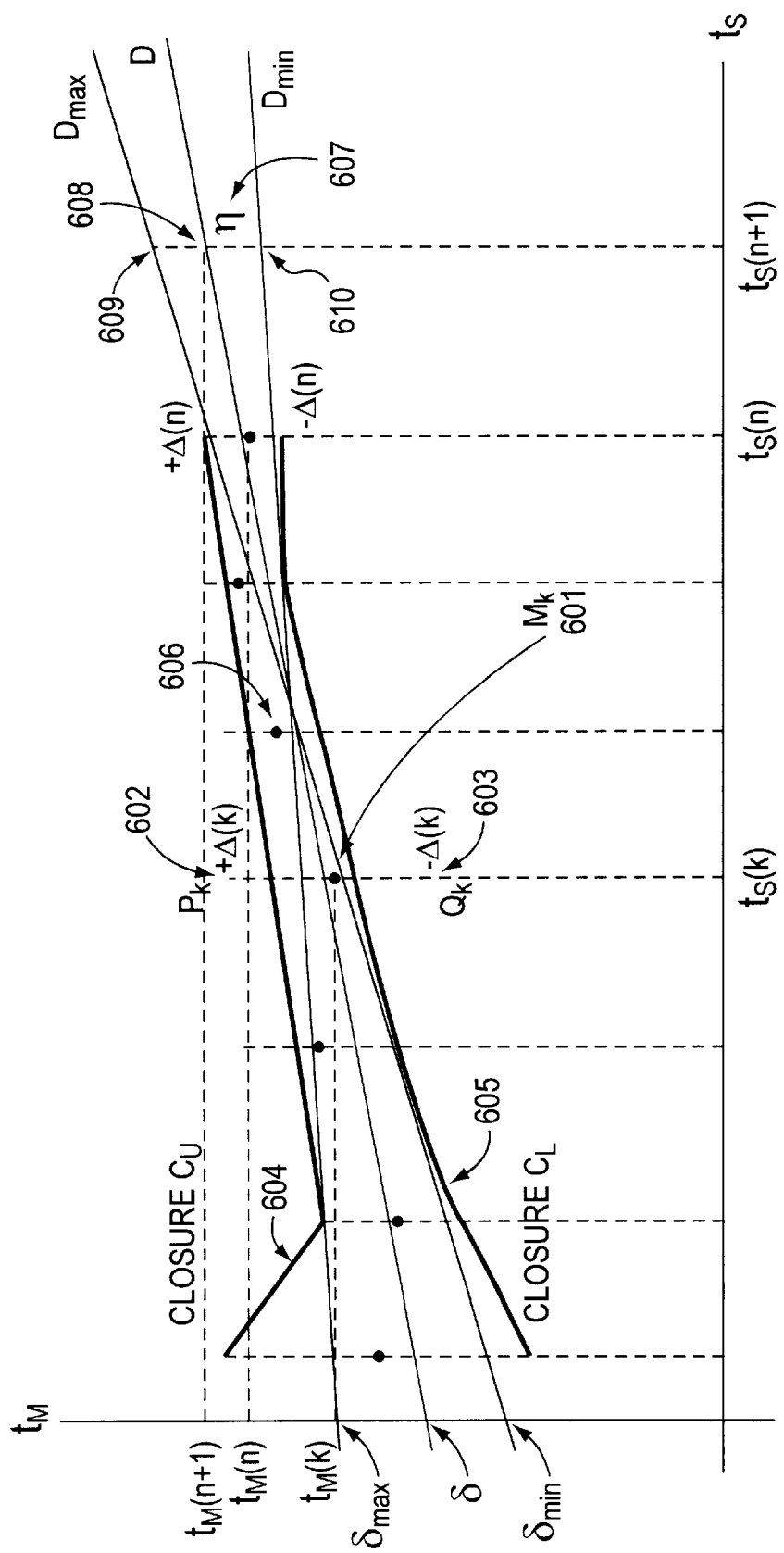
FIG. 6 is graph of $t_m$ (master time) and $t_s$ (slave time) illustrating the calculation of the parameters of FIG. 5 used to compute the conversion function.

In box 503, the inferior convex closure of $S_U$, referred to as $C_U$ is computed, as well as the superior convex closure of $S_L$ referred to as $C_L$. The computing of $S_U$, $S_L$, $C_U$, $C_V$, will be better understood by referring to the graph of FIG. 6. In FIG. 6, there is shown in 601 one above-defined point $M_k$ with two coordinates $(t_S(k), t_M(k))$. In 602 there is shown the corresponding point $P_k$ which belongs to $S_U$, and in 603 the corresponding point $Q_k$ belonging to $S_L$. Convex closure $C_U$ is shown in 604 and convex closure $C_L$ is shown in 605. Returning to FIG. 5, after box 503 is passed, decision box 504 is entered to test if there is an intersection between closures $C_U$ and $C_L$. If there is an intersection, box 505 is entered for discarding erroneous points of the History that caused the crossing of the two closures. Crossing of the two closures may occur for example, subsequently to a time adjustment made on the master clock (e.g. summer/winter time change) or to a change in the master clock frequency (e.g. variation of quartz temperature). Then box 501 is entered again to recycle. Conversely, if there is no intersection between the two closures, box 506 is entered for discarding the points in the History which are not used anymore by closures $C_U$ and $C_L$ and are consequently not useful to improve the precision. One of such unused point is shown in FIG. 6 at 606. After box 506 is passed, box 507 is entered to compute lines $D_{max}$ and $D_{min}$. $D_{max}$ and $D_{min}$ are represented in FIG. 6 and can be defined as the lines of respectively maximum and minimum gradient joining $C_U$ and $C_L$ without crossing them (they are consequently tangential to $C_U$ and $C_L$). The gradients of $D_{max}$ and $D_{min}$ respectively provide actual values of $(1+\sigma_{max})$ and $(1+\sigma_{min})$ with their line equations expressed as follows:

$$D_{max}: t_M=(1+\sigma_{max}) \cdot t_S+\delta_{max} \quad (7)$$

$$D_{min}: t_M=(1+\sigma_{min}) \cdot t_S+\delta_{min} \quad (8)$$

$D_{max}$ and $D_{min}$ represent the position in terms of gradient of the extreme lines between which the actual conversion line lies.

In box 508, housekeeping of the History is again performed to limit the size of the History file. In box 509, the bisecting line D of $D_{max}$ and $D_{min}$ is computed. Bisecting line D which is chosen so as to represent the actual conversion line, is represented in FIG. 6 and has the following line equation:

$$D: t_M=(1+\sigma) \cdot t_S+\delta \text{ with } \sigma=\tfrac{1}{2} \cdot (\sigma_{max}+\sigma_{min}) \text{ and } \delta=\tfrac{1}{2} \cdot (\delta_{max}+\delta_{min}) \quad (9)$$

Finally, in box 510, the parameters necessary for computing the conversion function to be applied upon request for converting a defined slave time value into master time base, are stored. These parameters comprise the History (H) file, software representations of lines D, $D_{max}$ and $D_{min}$, and of convex closures $C_U$ and $C_L$. Using these stored parameters for time conversion will be further described in connection with FIG. 7. Returning to decision box 501, if the History contains less than two points (i.e. zero or one point), box 511 is entered for computing $D_{max}$ and $D_{min}$ defined above, using values of $\sigma_{max}$, $\sigma_{min}$ set at process initialization (FIG. 3, box 301), or using current values of $\sigma_{max}$, $\sigma_{min}$ i.e. previously computed. Then, box 509 is directly entered for computing bisecting line D.

Figure 7:
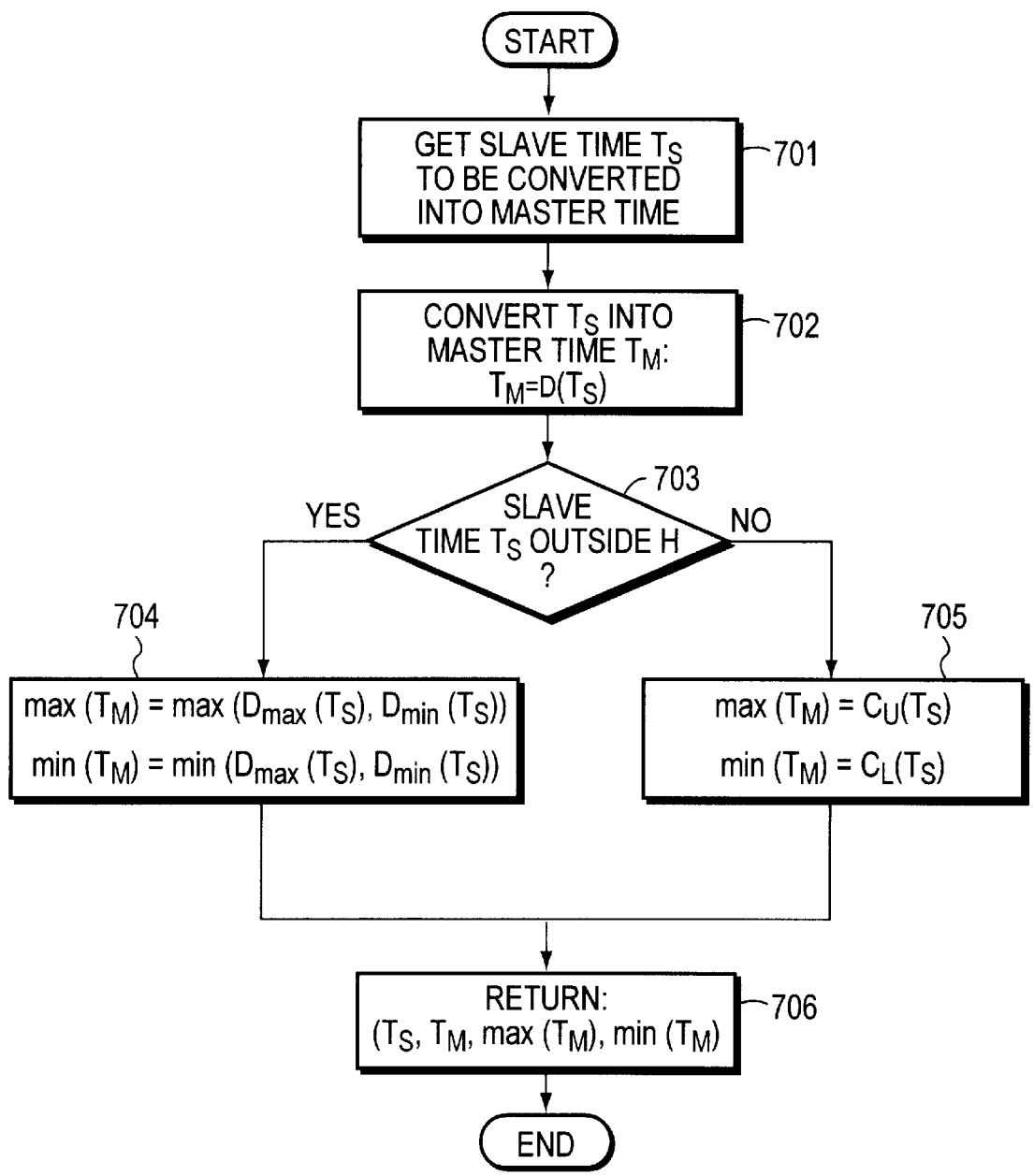
FIG. 7 is a flow chart showing the sequence of operations accomplished in a slave node for achieving a requested time conversion using the conversion function, according to the principles of the present invention.

Referring to FIG. 7 there is shown a flow chart illustrating the sequence of operations required for converting a given slave time value into its master time base and providing the associated uncertainty interval. These operations rely upon the parameters regularly computed and stored within the slave node as previously recited in connection with FIG. 5. In box 701 of FIG. 7, a peculiar slave local time value $T_S$ is provided, for example upon request of a network task or by a human operator, for being converted into master time base. Then, in decision box 702, the time conversion of slave time value $T_S$ is accomplished to provide a corresponding master time estimation value $T_M$, using the above-defined bisecting line D as represented by the formula $T_M=D(T_S)$, that is, by applying the equation (9) of D to $T_S$:

$$T_M=(1+\sigma) \cdot T_S+\delta \quad (10)$$

The latter equation (10) can be considered as defining the conversion function. For example, with reference to FIG. 6, if $T_S$ equals slave time value $t_S(n+1)$, the corresponding master time $T_M$ is obtained by reading the second coordinate of point 608 on line D which has $t_S(n+1)$ as first coordinate. This provides master time value $T_M=t_M(n+1)$.

Referring back to FIG. 7, in decision box 703, a test is made to determine whether or not slave time $T_S$ is comprised within the History (H), upon which a different approach for computing the uncertainty on computed master time value $T_M$ is applied. If slave time $T_S$ is outside History, box 704 is entered for computing the uncertainty on $T_M$ that is, providing a maximum value (max $(T_M)$) and a minimum value (min $(T_M)$) as follows:

$$\max(T_M)=\text{maximum } (D_{max}(T_S), D_{min}(T_S))$$

$$\min(T_M)=\text{minimum } (D_{max}(T_S), D_{min}(T_S)) \quad (11)$$

where $D_{max}$ and $D_{min}$ are to be replaced by their respective equation (7) and (8) above applied to $T_S$.

For example in FIG. 6, still for $T_S=t_S(n+1)$, $\max(T_M)$ corresponds to second coordinate (on "$t_M$ axis") of point 609 and $\min(T_M)$ corresponds to second coordinate of point 610.

Returning to FIG. 7, if slave time $T_S$ is comprised within the History (H), box 705 is entered for computing $\max(T_M)$ and $\min(T_M)$ using convex closures $C_U$ and $C_L$ as follows:

$$\max(T_M)=C_U (T_S)$$

$$\min(T_M)=C_L (T_S) \quad (12)$$

That is, referring to FIG. 6, one has to compute the intersection points between the line extending vertically above the slave time value marked on the "$t_S$ axis" and the convex closures $C_L$ and $C_U$. The second coordinate (on "$t_M$ axis") of the first intersection point (with $C_L$) provides min($T_M$), while the second coordinate of the second intersection point (with $C_U$) provides max($T_M$). In FIG. 6, a slave time value comprised for example between $t_S(k)$ and $t_S(n)$ is considered as being comprised within the History.

Referring further to FIG. 7, box 706 is finally entered for returning the slave time value ($T_S$) object of the conversion, the corresponding computed master time value $T_M$, and an uncertainty interval to be applied to $T_M$, said uncertainty interval being bounded with min($T_M$) and max($T_M$). In other words, master time converted value $T_M$ is provided with an uncertainty or error interval referred herein to as $\Sigma$, within which $T_M$ is guaranteed to be, with:

$$\Sigma = [\min(T_M), \max(T_M)]$$

Precision of the Conversion

The precision of the conversion is defined as the difference between max ($T_M$) and min ($T_M$). The present invention provides a means to guarantee a user requested precision $\eta$ for converting a slave node time value into a master time base. This is accomplished by determining the next polling time to compute one more "triplet" (as described above in connection with FIG. 3) in relation with the requested precision $\eta$. That is, the next polling moment in time is determined to be the slave moment ts, such that:

$$D_{max}(t_S) - D_{min}(t_S) = \eta \qquad (13)$$

where $D_{max}$ and $D_{min}$ are to be replaced by their respective equation (7) and (8) above applied to $t_S$.

For example, in FIG. 6, slave time value $t_S = t_S(n+1)$, corresponds to requested precision $\eta$ (607) and shall be the next polling moment in time to ensure precision $\eta$.

Example of Application

Referring again to FIG. 2, as already said, a network incorporating the present invention may contain a slave/master clock hierarchy with a plurality of masters i.e. time base references. In the hierarchy (I) of FIG. 2, nodes A and B have a common master which is node D; nodes D and E have a common master which is node C. As an illustration of the use of the present invention, let us imagine that one wants to compare the moments in time of occurrence of two events in different nodes in the network, one event (EV1) having occurred in node A at local time $T_{A1}$, and the other event (EV2) having occurred in node E at local time $T_{E2}$. In order to compare the moments in time of occurrence of these two events, it is necessary to refer to a same time base. In this example, it is suitable to use time base of node C. Therefore, the process will be as follows. Node A uses its own conversion function DA to convert moment of occurrence $T_{A1}$ of event EV1 into the time base of its master node D and provides a converted time: $T_{D1} = D_A(T_{A1})$, and an associated error interval $\Sigma_{D1}$. Then, node A sends the converted time $T_{D1}$ and the error interval $\Sigma_{D1}$ to node D, which in turn uses its own conversion function $D_D$ to convert $T_{D1}$ into its master time base, that is, into node C time base, to provide a converted time $T_{C1} = D_D(T_{D1})$, and an associated "new" error interval $\Sigma_{C1}$. Then, node D sends the converted time $T_{C1}$ and the error interval $\Sigma_{C1}$ to node C. The new error interval $\Sigma_{C1}$ is computed from the "old" error interval $\Sigma_{D1}$ as follows:

The upper boundary of the new error interval ($\Sigma_{C1}$) is determined as being the maximum value of the upper boundaries of the error intervals obtained when converting the upper and lower boundaries of the old error interval ($\Sigma_{D1}$).

The lower boundary of the new error interval ($\Sigma_{C1}$) is determined as being the minimum value of the lower boundaries of the error intervals obtained when converting the upper and lower boundaries of the old error interval ($\Sigma_{D1}$).

The same process applies to node E. Node E uses its own conversion function $D_E$ to convert moment of occurrence $T_{E2}$ of event EV2 into the time base of its master node C, to provide a converted time value $T_{C2} = D_E(T_{E2})$ and an associated error interval $\Sigma_{C2}$. Then, node E sends the converted time $T_{C2}$ and the error interval $\Sigma_{C2}$ to node C.

Finally, node C, which can be referred to as "common reference" for all the other nodes, acquires the moments in time of both events (EV1, EV2) converted into its own time base, that is, $T_{C1}$ and $T_{C2}$ and their associated error intervals $\Sigma_{C1}$ and $\Sigma_{C2}$. Then, all types of comparison or operation can be made with $T_{C1}$ and $T_{C2}$. For instance, the measure of the order of happening (sorting) or the delay in time between the occurrence of the two events in the network. Furthermore, the two error intervals $\Sigma_{C1}$ and $\Sigma_{C2}$ provided, are combined to produce an accurate final error interval which applies to the result of the comparison or operation.

In brief, as described above, the present invention provides a clock synchronization method in a communication network comprising a plurality of nodes in communication with each other by data transfer over communication links, with each of the nodes having its own local time base and exchanging timing information with a predefined node called master whose time base is the master clock against which said local time base is to be synchronized. At predefined moments in time, each node having a master exchanges timing information with the master node, calculates therefrom a timing data and stores said timing data into a predefined storage location called History; such as to obtain after at least two exchanges, a sequence of timing data stored in the History. Then, from said sequence of timing data, a set of parameters is calculated and stored. These parameters are further used for computing a conversion function whereby the node local time is converted upon request into the master time base with a prespecified and guaranteed precision.

While the invention has been described in terms of a preferred embodiment, those skilled in the art will recognize that the invention can be practiced with variations and modifications. Therefore, it is intended that the appended claims shall be construed to include both preferred embodiment and all variations and modifications thereof that fall within the scope of the invention.

What is claimed is:

1. In a communication network comprising a plurality of nodes in communication with each other by data transfer over communication links, with each of the nodes having its own local time base and exchanging timing information with a predefined master node having a master time base which serves as a master clock against which said local time base is to be synchronized, a clock synchronization method for converting the node local time into the master time base, comprising the steps of:

assigning a master at each node;

at predefined moments in time, exchanging timing information with the master node; calculating therefrom a timing data and storing said timing data into a predefined storage location called History, such as to obtain after at least two exchanges a sequence k of timing data stored in the History;

calculating and storing a set of parameters from said sequence of stored timing data;

computing a conversion function using said calculated parameters whereby local time is converted upon request into the master time base with a pre-specified and guaranteed precision η.

2. The method of claim 1 wherein:

said conversion function is defined by the following relation:

$$T_M = (1+\sigma) \cdot T_S + \delta$$

where: $T_S$ is a local time value to be converted, $T_M$ is the master time value obtained, and $\sigma$, $\delta$ are computed constants; and said pre-specified and guaranteed precision η is determined by the provision of a maximum value $\max(T_M)$ and a minimum value $\min(T_M)$ associated with the master time value $T_M$ obtained by conversion such that: $\eta = \max(T_M) - \min(T_M)$.

3. The method of claim 1 wherein each of said timing data k comprises a local time value $t_S(k)$ an estimation of the corresponding master time value $t_M(k)$, and an error $\Delta(k)$ which applies to said estimated master time value.

4. The method of claim 1 wherein the step of calculating said parameters further comprises the steps of:

computing a software representation of two sets of points $S_U$ and $S_L$ of timing data in the History and defined as follows:

$$S_U = \{\text{points } P_k \text{ of coordinates } (t_S(k), t_M(k)+\Delta(k)), \forall k\}$$

$$S_L = \{\text{points } Q_k \text{ of coordinates } (t_S(k), t_M(k)-\Delta(k)), \forall k\}$$

where k designates any timing data stored in the History;

computing a software representation of an inferior convex closure or $C_U$ of $S_U$, and of a superior convex closure or $C_L$ of $S_L$; and computing a software representation of lines $D_{max}$ and $D_{min}$ defined as being lines of respectively maximum and minimum gradient joining closures $C_U$ and $C_L$ without crossing them, thereby obtaining a position of the conversion function in terms of gradient of the extreme lines between which a conversion line D representing said conversion function lies.

5. The method of claim 4 wherein said lines $D_{max}$ and $D_{min}$, D are defined by the following equations:

$$D_{max}: t_M = (1+\sigma_{max}) \cdot t_S + \delta_{max}$$

$$D_{min}: t_M = (1+\sigma_{min}) \cdot t_S + \delta_{min}$$

where $t_S$, $t_M$, represent respectively a local time value and a master time value, and $\sigma_{min}$, $\sigma_{max}$, $\delta_{min}$, $\delta_{max}$ are computed constants.

6. The method of claim 5 wherein said computed constants $\sigma$, $\delta$ in the relation defining said conversion function are determined by:

$$\sigma = \tfrac{1}{2} \cdot (\sigma_{max} + \sigma_{min})$$

and $$\delta = \tfrac{1}{2} \cdot (\delta_{max} + \delta_{min}).$$

7. The method of claim 1 further comprising the steps of:

each node of the network using its own conversion function for converting a received time stamp information and transmitting the converted time stamp information with an associated precision to its master node, so as to achieve a propagation of the time stamp information over the network towards a destination node, whereby when reaching the destination node, said time stamp information is already converted into the destination node time base.

8. The method of claim 1 wherein said predefined moments in time at which timing information is exchanged with the master node, are predefined such as to guarantee a pre-specified precision η.

9. A communication network node comprising:

means for exchanging a sequence of timing information with a master node having a master time base;

means for calculating timing data for the node; the master node and uncertainty information from the timing information;

means for storing the calculated timing data in a History;

means for calculating and storing a set of parameters for local—master time conversion from the calculated timing data; and means for converting the node local time into the master time base with a pre-specified and guaranteed precision using the set of stored parameters.

10. In a communication network, a clock synchronization system using a continuous conversion function for synchronizing local clocks of nodes in the network, comprising:

means for communication among the nodes by data transfer over communication links, with each of the nodes having its own local time base;

means for exchanging timing information of a node with a predefined master node having a master time base which serves as a master clock against which said local time base is to be synchronized;

means for calculating timing data from the timing information and a set of parameters for local—master time conversion from the calculated timing data; and means for computing a conversion function and using the parameters whereby local time is converted into the master time base η.

11. The clock synchronization of claim 10 wherein each node of the network using its own conversion function for converting a received time stamp information and transmits converted time stamp information with an associated precision to its master node, so as to achieve a propagation of the time stamp information over the network towards a destination node, whereby when reaching the destination node, said time stamp information is already converted into the destination node time base.

12. The clock synchronization system of claim 11 further comprising:

means for storing a sequence of the calculated timing data in a History.

13. The clock synchronization system of claim 12 further comprising:

means for computing the conversion function to have a pre-specified and guaranteed precision.

14. The clock synchronization system of claim 13 further comprising:

means at each node for computing a conversion function for converting the local time base into a master time base of a master node.

15. The clock synchronization system of claim 14 wherein the sequence of timing data k comprises a local time value $t_S(k)$, an estimation of the corresponding master time value $t_S(k)$, and an error $\Delta(k)$ which applies to said estimated master time value.

* * * * *